Aug. 7, 1928.
A. BLADES ET AL
1,680,083
GEAR CHAMFERING MACHINE AND METHOD FOR CHAMFERING GEAR TEETH
Filed Sept. 25, 1923    3 Sheets-Sheet 1
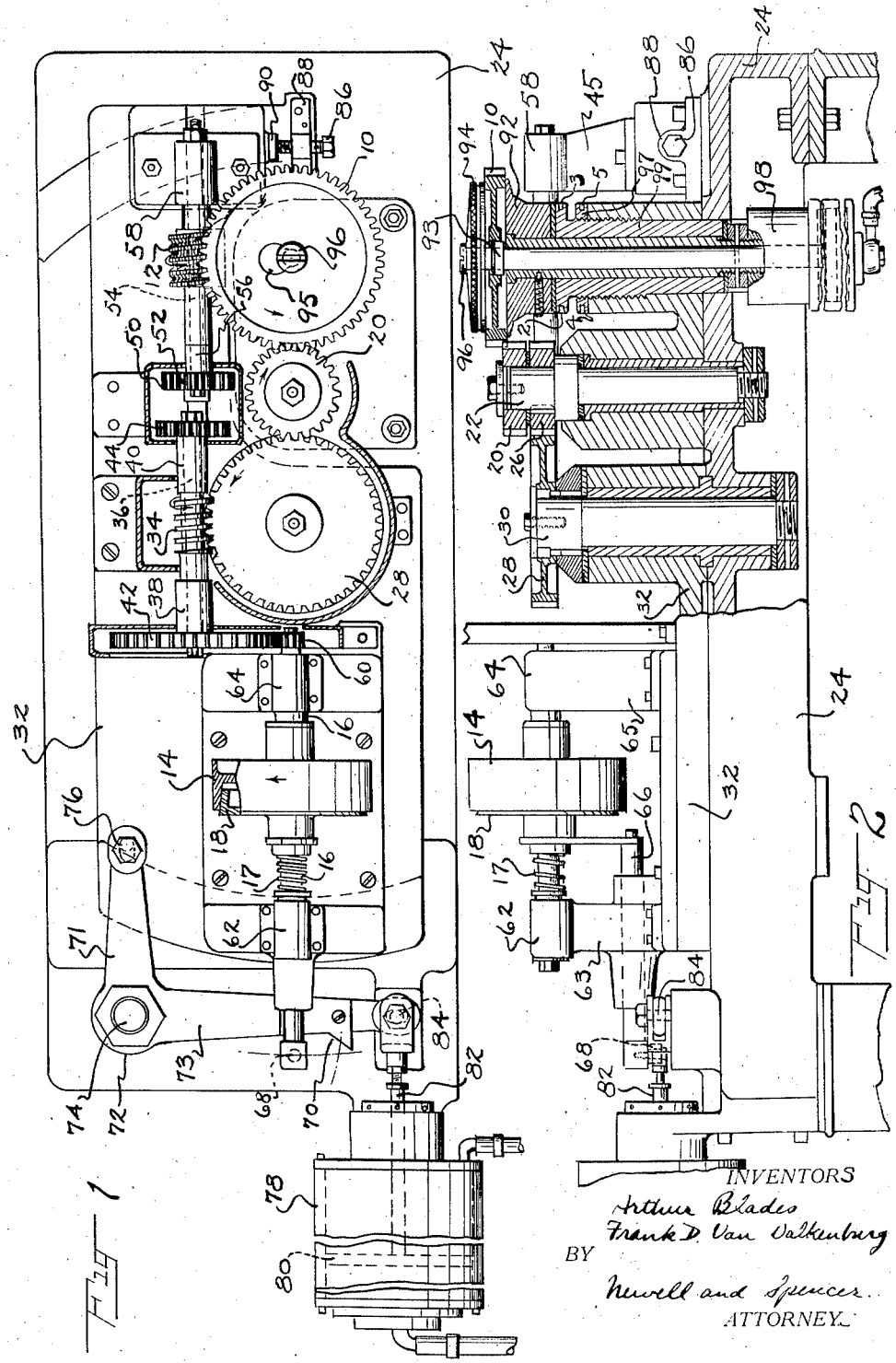
INVENTORS
Arthur Blades
Frank D. Van Valkenburg
BY
Newell and Spencer
ATTORNEY

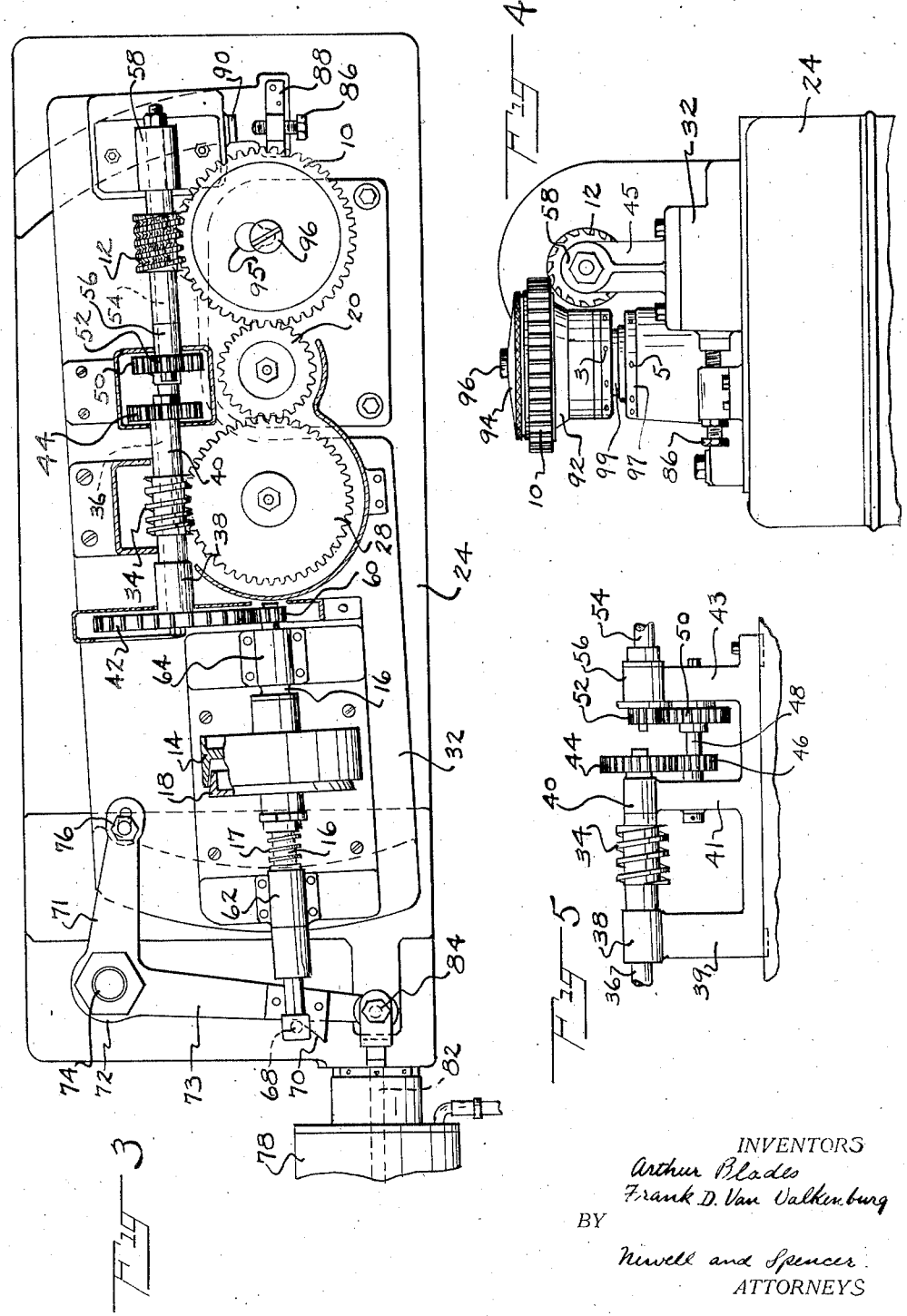

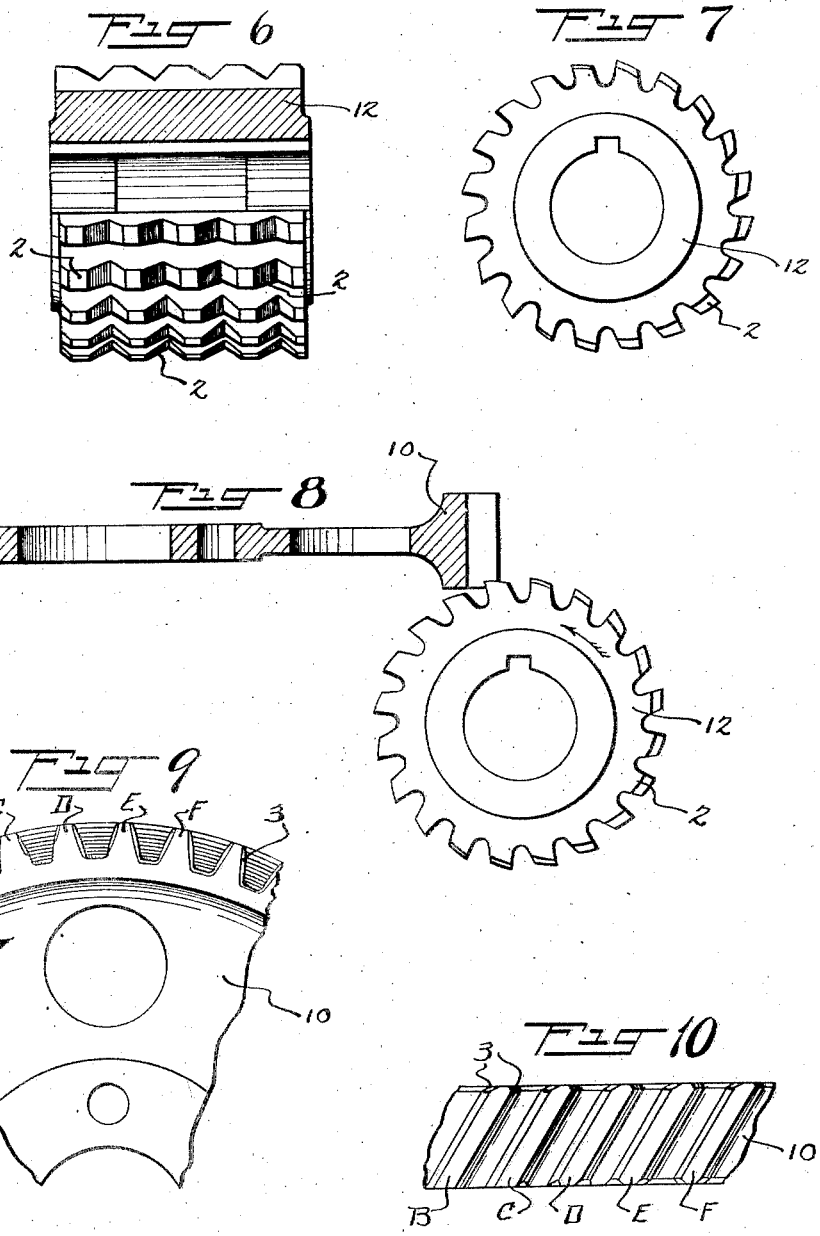

Patented Aug. 7, 1928.

1,680,083

UNITED STATES PATENT OFFICE.

ARTHUR BLADES AND FREDERICK D. VAN VALKENBURG, OF DETROIT, MICHIGAN, ASSIGNORS, BY MESNE ASSIGNMENTS, TO DODGE BROTHERS, INC., A CORPORATION OF MARYLAND.

GEAR-CHAMFERING MACHINE AND METHOD FOR CHAMFERING GEAR TEETH.

Application filed September 25, 1923. Serial No. 664,680.

The present invention relates to a gear chamfering or burr-removing machine, and a method for chamfering gear teeth. More particularly the invention relates to a machine and method for chamfering the edges of gear teeth, or removing the burrs formed during manufacture at the intersection of the working surfaces of the teeth with the end faces thereof.

The operation of removing the burrs from gear teeth is commonly done by hand by means of a file, for the purpose of producing a clean, smooth edge upon the teeth. It is a general object of the present invention to provide a machine for removing the burrs from gear teeth of any form, whether straight, cycloidal, epicyclic or other form, by means of which a uniform operation may be obtained, and to attain a saving in the cost of finishing gear teeth. Another object of the invention is to provide a machine for finishing gear teeth in which the hob or cutter may be brought out of engagement with the work by a means having combined therewith mechanism for disconnecting the driving means. Another object of the invention is to provide a machine by means of which the burrs may be removed from gear teeth with one cut on the teeth, and with only one revolution of the gear from which the burrs are to be removed. Another object of the invention is to provide a cutting device which may be varied in form to be adapted for chamfering any form of gear teeth. A further object of the invention is to provide a method of finishing gear teeth which shall be more rapid than the hand filing operation and which is carried on by mechanical means requiring less skill for operation than with the filing operation, and in which a uniform efficiency is attained.

With these and other objects in view the invention comprises the various features hereinafter described and more particularly defined in the claims.

In the drawings, which represent the preferred embodiment of our invention,

Fig. 1 is a plan view of the device showing a cutter in cutting position upon the work, and driving means in engaging position;

Fig. 2 is a view in elevation of the device, a part thereof being shown in section;

Fig. 3 is a plan view of the machine showing the cutting gear or hob moved out of engagement with the work and with the driving means disconnected;

Fig. 4 is a profile view of the machine as seen from the right in Fig. 2, showing the cutter or hob in operative position on the work;

Fig. 5 is a detail view of the train of gears connecting the worm shaft with the hob shaft;

Fig. 6 is a view in elevation and partly in section of a cutter showing a form of cutting teeth which may be employed in chamfering a worm gear;

Fig. 7 is an end view of the cutter shown in Fig. 6;

Fig. 8 is an enlarged view of a section of a gear, and a cutter in cutting engagement with a tooth thereof;

Fig. 9 is a detail view of a section of a worm gear illustrating the method of cutting or chamfering the teeth thereof; and Fig. 10 is a pain view of the teeth shown in Fig. 9 as seen from above.

The work, represented by gear 10, which is to be chamfered or from which the burrs are to be removed, is fastened in rotative position so that it may be operated upon by a suitable cutting device 12, preferably a hob, when moved into cutting position as illustrated in Figs. 4 and 8. The cutter or hob 12, shown in detail in Figs. 6 and 7, is provided with teeth 2 of the proper form to produce a slight chamfer or cut 3 (see Figs. 9 and 10) on the edges of the teeth formed by the intersection of the working surfaces and the end faces of the teeth.

During the cutting operation of the blanks upon which the gear teeth are cut, a burr is generally formed upon one face of the gear at the edges above referred to, which it is customary to remove by a hand filing operation. By removing this burr by the means hereinafter described, a more uniform cut is attained by which the appearance of the gear is considerably improved and the chamfering operation is done at a greatly increased speed and at a lower cost than is attained with hand filing. It is in general desirable to chamfer both faces of the gear in order to remove all sharp edges in the finishing operation which may be attained, for example, by simply turning the work over in the machine after the operation has been performed on one side.

The particular form of hob or other cutting means which is to be employed for the chamfering operation, depends upon the form of the gear teeth to be chamfered or cut. For the ordinary form of gear teeth in which the working faces of the teeth are parallel to the axes of rotation of the gear, the cutting edges of the teeth of the cutter to be employed should be inclined at the same angle with respect to the axis of rotation of the hob, and the faces of the teeth should obviously be inclined at the same angle. The angle of the cutting edge and the size of the hob or cutter to be employed depends obviously upon the size of the gear teeth to be cut. The form and size of cutter to be used and the angle of inclination of the cutting edges of the teeth thereof will be apparent to those skilled in the art. If the form of gear to be operated upon is one in which the working faces of the teeth are inclined to the axis of rotation of the gear such as the teeth upon a worm gear, for example as illustrated in Figs. 9 and 10, the form of hob or cutter to be employed is one in which the faces of the cutting teeth or the cutting edges upon the two sides of the raised helical cutting surfaces are at a different inclination depending upon the pitch of the teeth to be operated upon. It is obvious that the angle of inclination of the cutting edges of the hob should be such as to produce a bevel upon the edges of the teeth to be operated upon which will be substantially at right angles to the bi-sector of the angle formed by the faces intersecting at that particular edge.

The particular form of the hob or cutter to be employed may be determined by running a lead blank in contact with and in mesh with the gear to be operated upon, whereby the angles necessary for contact of the cutting edges of the cutter will be developed upon the blank.

Suitable gearing is provided for driving the gear and cutter so as to attain definite relative speeds of the work and cutter so that the cutting edges of the latter will move over the edges of the teeth as they are advanced into cutting position. By suitably regulating the position of the cutter with respect to the work, the depth of cut on the teeth may be controlled. The driving means for the gears comprises a loose pulley 14 mounted upon a shaft 16, to which is keyed a cone clutch 18, by means of which the shaft 16 is driven when the clutch is brought into engagement with the pulley, which in turn is suitably driven from any source of power by means of a belt.

The various parts of the device together with the operation thereof may now be described in detail. The gear 10 is meshed with and rotated by a gear 20, which is carried on a stud 22, secured in the main bed or frame 24 of the machine. Secured to the gear 20, and turning also with the stud 22, is another gear 26, which is meshed with a gear 28 mounted on a stud 30. The stud 30 is mounted so as to rotate in a suitable bearing and is held in position in the main bed 24 of the machine by suitable means therefor. The stud 30 and its bushing serve as a pivot for a table 32 which rotates about the bushing surrounding the stud. The table 32 carries the cutter or hob 12 and is adapted to swing or move so that the hob or cutter moves into and out of engagement with the work or gear to be finished.

The studs 22 and 30 which are rotatably mounted independently of the table 32 are held in position by means of suitable thrust washers, above the table portion and by collars attached to the studs by means of pins, below the main bed as shown in the drawings.

The gear 28 is driven by a worm 34 on a shaft 36, which is mounted in bearings 38 and 40, carried by supports 39 and 41 respectively. The worm shaft 36 carries at one end thereof a gear 42 and has attached thereto at the other end a gear 44 which meshes with a gear 46 on a shaft 48, supported in bearings in the supports 41 and 43. Attached also to the shaft 48 is a gear 50 which meshes with a gear 52 on a shaft 54, which carries the cutter 12. The shaft 54 is supported in bearings 56 and 58 carried by supports 43 and 45 respectively.

The gear 42 which is carried by the shaft 36 is driven by a pinion 60 on the shaft 16, previously described as carrying the loose driving pulley 14. The shaft 16 is mounted in bearings 62 and 64, the former being carried by a support 63, and the latter by a support 65. The cone clutch 18 which is keyed to the shaft 16 is normally held in engagement with the pulley 14 by means of a spring 17 carried by the shaft 16. In order to disconnect the cone clutch 18 from the pulley 14, a shifter 66 is provided, which is slidably mounted in the support 63 and is adapted to be moved or shifted by means of a roller 68 carried thereby when engaged by a cam or cam surface 70 carried by the table moving mechanism which will now be described.

The parts of the machine including the shafts 16, 36, 48 and 54, the hob 12, the pulley 14 and cone clutch 18 together with the gears directly connected to the above mentioned shafts, are carried by the movable table 32, which is mounted upon the main bed and pivoted so that it may swing or move about the bushing surrounding the stud 30 as an axis. In order to operate the table so as to swing the cutter or hob into and out of engagement with the work, a lever 72, preferably of the bell-crank type, is provided which is supported on a pivot 74. One arm 71 of the lever is attached to the table, preferably by a pin and slot connection 76 and the other arm 73 thereof is attached to a suitable operating means. In order to operate the lever we preferably employ a pneumatically operated cylinder 78 having a piston 80 therein which is attached through a piston rod 82 to the arm 73 by means of a pin and slot connection 84. The swinging movement or rotation of the table 32 is limited in the disengaging movement of the table, by the extent of the slot openings. In order to limit the closing movement or cutter engaging movement, a screw stop 86, carried by a suitable bracket or support 88 is provided which is adapted to engage a projection 90 upon the movable table. By adjusting the position of the screw stop, the relative positions of the cutter and the teeth of the work are determined whereby the depth or amount of cut by the hob is regulated.

In operating the machine the work or gear 10 is placed in position upon a support 92, a bushing 93 serving to center the work, and a clamping plate 94 is fastened over the work by means of a bolt 96, which passes downwardly through the plate and bushing as shown in Fig. 2 of the drawings. Before fastening the bolt, the vertical position of the gear 10 is adjusted by loosening a lock nut 97 on the outer bushing 99 and then screwing the bushing 99 in or out of the casting which supports it until the desired vertical position is attained. The bushing and lock nut may be operated by means of a spanner wrench adapted to engage the holes 2, 3 on the bushing, and 4, 5 on the lock nut. After the bushing 99 has been adjusted, the lock nut 97 is secured in position and the bolt 96 may then be tightened to fasten the work in place. The bolt is preferably drawn downwardly by means of an air cylinder 98 which is operated by means of an admission valve preferably controlled by a foot-pedal. The clamping plate 94 is constructed with an opening 95 therein so that it may be passed over the bolt on the work and centered thereon, without the necessity of removing the bolt 96. The operation of the air cylinder 98 is preferably controlled in a manner similar to that of the cylinder 78, by means of a valve which may be operated by means of a foot pedal. Other suitable means for shifting the valves may be employed if desired.

When the work is in place the machine is started by means of the pedal which operates the cylinder 78, by means of which the lever 72 is rotated from the position shown in Fig. 3 to that shown in Fig. 1 as a result of which the roller 68 is released from the cam 70, and the spring 17 forces the cone clutch 18 into contact with the rotating pulley 14. Rotary motion is thereby imparted to the shaft 16, and the gear 10 and cutter 12 are thereby caused to rotate through the intermediate gears connected therewith in the direction indicated in Figs. 1 and 4, and the cutting operation by the hob or cutter on the gear teeth is effected. It is important that the rotation of the hob in connection with the work be in the direction indicated in Fig. 4 in order to avoid the possibility of forming a new burr on the working surfaces of the gear teeth. After the work has made one revolution so that all the gear teeth have been acted upon, the cylinder 78 is operated so as to swing the bellcrank lever 72 in a clockwise direction around the pivot 74, whereby the table is swung in a counter clockwise direction and the cutter is thereby moved away from the work. In the movement of the lever 72 the cam 70 thereon moves into contact with the roller 68 and operates the cone clutch shifter 66, moving the clutch away from the pulley 14 and stopping rotation of the cutter and work. The work may then be removed by releasing the pressure on the bolt 96 caused by the air cylinder 98 and removing the clamping plate 94.

The cutting or chamfering of the gear teeth is illustrated in Figs. 9 and 10 in which A, B, C, D, E, F, represent teeth upon a worm gear. The teeth A and B have not been reached by the cutter upon the face of the gear shown in Fig. 9 corresponding to the lower face of the gear in Fig. 10. The cut has just commenced upon the tooth C but the tooth has not rotated far enough into contact with the cutter to have the lower part of the edge chamfered. The tooth D has been cut upon its leading face but the trailing face has just moved into contact with the cutter, so that only a small cut has been taken at this edge. The tooth E, as shown, has been chamfered upon both side edges, but the edge at the base of the teeth, between the teeth D and E has not been reached by the cutter. In the next stage of the cutting the lower edge between the teeth E and F has been cut or chamfered. In this position the teeth E and F of gear 10 are at substantially the central portion of the cutter 12. As the work rotates further the cut upon the trailing edge of the teeth E and F progresses and is completed at the point where the teeth of the gear move out of contact with the cutter. It is apparent therefore that in the relative rotations of the gear and cutter the effective cutting takes place in effect progressively along the edge of the teeth beginning at the upper edge of the leading face of one tooth and progressing downwardly along its edge to the base portion between the teeth and then upwardly along the edge of the next tooth until the cutting operation is completed. It is obvious that the cutting operation takes place more or less simultaneously upon the two sides of a tooth, but the major operation of cutting is effected in the mode described above.

It is to be understood that various changes and modifications may be made in the details of construction of the device, as will appear to those skilled in the art, without departing from the spirit or scope of the invention as defined in the claims. The device may obviously be employed for chamfering, finishing or removing the burrs from gears of any size and having any of the various forms of gear teeth, by employing a cutter of the proper size and with the proper cutting teeth, and suitably adjusting the gear ratios to attain the desired relative rotation of the hob and the work.

Having thus described the invention, what is claimed as new is:

1. In a machine for finishing gear teeth, means for fastening a gear to be operated upon in fixed rotatable position, a cutter, means for rotating said cutter and gear in timed relation in engagement with each other, the said cutter having cutting teeth thereon of a form adapted to pass over the edges of the teeth of the gear on one face thereof in a continuous movement during the rotation so as to chamfer the edges of the teeth on one face of the gear in one revolution thereof with respect to said cutter, means for swinging said cutter into and out of cutting position on said gear, and means for automatically disconnecting said driving means when said cutter has been moved a predetermined distance away from said gear.

2. In a machine for chamfering gear teeth, a movable table, a cutter supported on said table and rotatable about a fixed axis in engagement with the teeth of a gear to chamfer the edges of said teeth, adjustable means for holding a gear to be operated upon independently of said table, means for driving said cutter and gear in timed relation, said means being adapted to cooperate with the gear-holding means to cause the gear and cutter to register when brought into engagement with each other whereby said cutter passes continuously over the edges of the teeth around one face of the gear, and means for predetermining the amplitude of the cutter table movement.

3. In a machine of the kind described, an oscillatory table, a hob supported on the table, means for holding a gear to be operated upon independently of said table, means for driving said hob and gear, means for oscillating said table to bring said hob into and out of cutting position on said gear, and means cooperating with the last named means for disconnecting said driving means when the said hob is moved out of cutting position.

4. In a machine for chamfering gear teeth, a movable table, a bellcrank lever operatively connected to said table, a cutter supported on said table and rotatable about a fixed axis in engagement with the teeth of a gear to chamfer the edges of said teeth, means for supporting a gear to be operated upon independently of said table, means for driving said gear and cutter in registering timed relation, and means for operating the bellcrank lever to move the table and cutter into and out of engagement with said gear, in a single uninterrupted movement.

5. In a machine of the kind described, a rotatable table, a bellcrank lever operatively connected to said table, a cutter supported on said table, means for supporting independently of said table a gear to be operated upon by said cutter, driving means connected to said cutter and gear adapted to cause a timed relative rotation during engagement of the cutter with the gear, said means permitting continuous contact of said cutter with the gear during the complete cutting operation on one face of the gear, means operated by said bellcrank lever for disconnecting said driving means, and means for operating the bellcrank lever to turn said cutter into and out of engagement with said gear.

6. In a machine of the kind described, a cutter, means for holding a gear to be operated upon by said cutter, means for driving said gear and cutter in timed relation, means for bringing said cutter into and out of connecting position on said gear, means for disconnecting the gear and cutter driving means, said disconnecting being controlled by the means for engaging and disengaging the cutter and gear.

7. In a machine of the kind described, a movable table, a lever connected thereto, a cutter connected to the table, a gear to be operated upon by said cutter, means for supporting said gear independently of said table, means for driving said cutter while in cutting engagement with said gear, means for operating said lever to turn said table and bring said cutter out of cutting engagement with said gear, a cam connected to said lever, and means operated by said cam for disengaging said driving means when said cutter is moved out of cutting engagement.

8. In a machine of the kind described, a movable table, a lever pivoted independently of said table and operatively connected thereto for turning said table, means for supporting a gear from which burrs are to be removed, a cutting hob for removing said burrs, supporting means for said cutting hob connected to said table, means for driving said cutting hob while in engagement with said gear to be finished, means for operating said lever to turn said hob out of cutting engagement with said gear, a cam connected to said lever, a cone clutch connected to said driving means, and a roller connected to said cone clutch and operated by said cam for disengaging said driving means when said lever is moved to turn said table into disengaged position of said cutting hob.

9. In a machine of the kind described, a main gear, means for driving said gear, a gear from which burrs are to be removed, an idler between said gears, a cutter, a worm gear connected to said main gear, means for driving said worm gear, a train of gears connecting said worm gear to said cutter to attain the desired timed relation in the movements of said cutter and gear from which burrs are to be removed, means for moving said cutter and connecting gears about said main gear as an axis into engaging and non-engaging position of the cutter with respect to the gear from which burrs are to be removed, and means for disengaging said driving means when said cutting gear is moved into non-engaging position.

10. In a machine for chamfering gear teeth, means for holding a gear to be operated upon, a cylindrical cutter for chamfering the teeth of said gear, teeth on the cutter arranged in a helical path thereon, means for rotating the cutter, means for engaging a gear with said cutter with its teeth between the cutter teeth, means for moving the gear with respect to the cutter in timed relation to the rotation of the cutter so as to cause the teeth of the cutter to move progressively in contact with the edges of the teeth upon the gear, said gear engaging and rotating means being so adjusted as to cause the cutter to chamfer the edges of the gear only.

11. In a machine for chamfering gear teeth, means for holding a gear to be operated upon, a cutter, teeth on the cutter arranged in a helical path thereon, means for rotating said gear in one plane, means for rotating said cutter in a plane perpendicular to the plane of the gear and at an elevation so that the teeth of the cutter move progressively into contact with and chamfer the edges of the gear teeth whereby said edges are cut progressively from the top of one tooth to the bottom thereof and upwardly along the edge of the next tooth.

12. A method of chamfering gear teeth which comprises effecting relative movement of a chamfering cutter over the teeth of a gear, rotating said cutter about an axis parallel to the plane in which said gear is located but displaced therefrom and continuously in contact with the teeth of said gear so that the teeth of the cutter remove material from the edges of the teeth on one face of said gear in a single continuous cutting path and in a single operation, producing thereby a chamfering on the edges of the teeth.

Signed at Detroit, Michigan, this 19th day of September, 1923.

ARTHUR BLADES.
FREDERICK D. VAN VALKENBURG.